Figure 1:
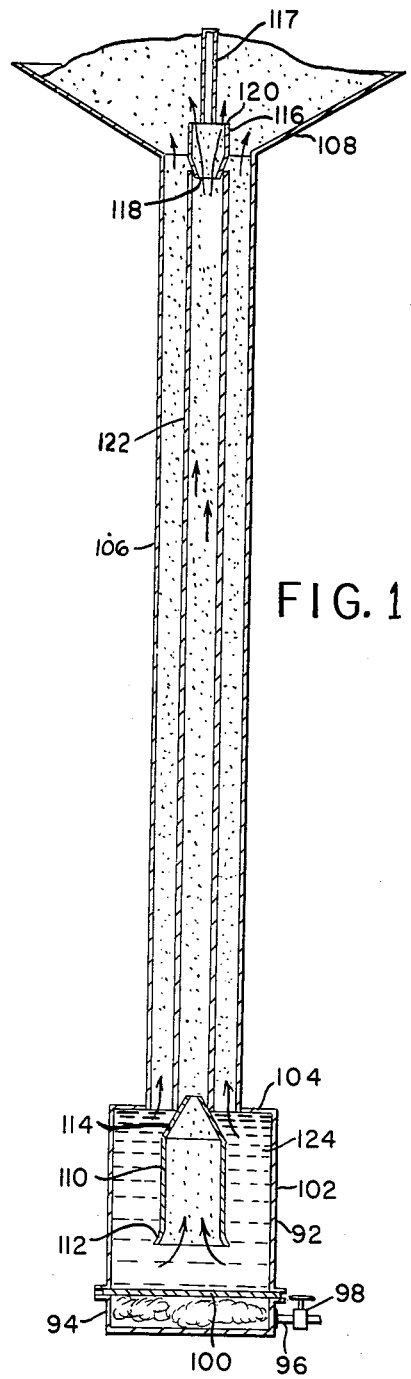

Nov. 13, 1962    E. GEMMER    3,063,860
FLUIDIZED BED COATING METHOD AND APPARATUS
Filed Dec. 20, 1957    2 Sheets-Sheet 1

ERWIN GEMMER
INVENTOR

BY
HIS ATTORNEYS

ERWIN GEMMER
INVENTOR

United States Patent Office 3,063,860
Patented Nov. 13, 1962

3,063,860
FLUIDIZED BED COATING METHOD AND
APPARATUS
Erwin Gemmer, Frankfurt am Main, Germany, assignor to Knapsack-Griesheim Aktiengesellschaft, Knapsack, near Koln, Germany, a German company
Filed Dec. 20, 1957, Ser. No. 704,086
Claims priority, application Germany Dec. 11, 1954
18 Claims. (Cl. 117—18)

The present invention relates to the production of protective coatings, and concerns a method and means particularly useful in producing such coatings on the interior surfaces of hollow articles. The application is a continuation-in-part of my applications Serial No. 427,481, filed May 4, 1954 and Serial No. 551,943, filed December 8, 1955, both now abandoned.

An important object of the present invention is the production of coatings and linings which are particularly suitable for protecting the relatively inaccessible interior surfaces of tubular and hollow articles which may be exposed to destructive or corrosive fluids, solvents and chemicals, or which must be electrically insulated, or which must resist mechanical abrasive or frictional wear. Some of the materials from which the tubular shapes requiring internal and/or external surface protection may be made include the various metals and materials disclosed in my application Serial No. 551,943.

Materials which possess superior resistance to chemicals and solvents or which are electrical insulators or which are resistant to mechanical abrasive or frictional wear often are quite expensive and do not possess sufficient mechanical strength and rigidity for use other than as coatings in mechanical structures. Also, the very resistance to solvents and other chemicals for which these materials may be valued as corrosion preventing layers upon a surface often make them difficult to apply as coatings by presently known methods, such as by painting or spraying in a liquid solvent or liquid dispersion form.

Accordingly, it is another important object of the present invention to provide a new and improved process and apparatus for the production of superior internal coatings without any necessity for the use of liquid solvents or dispersing agents for the coating materials.

Another important object of the present invention is to provide an improved process and apparatus which is particularly suited for coating elongate hollow articles of irregular and complicated shapes. Such articles may include, for instance, all kinds of tubing and pipe, tubular sleeves, sleeve bearings, ventilators and ducts; pump chambers and cylinders; retorts, autoclaves, and process vats and chambers, tanks and vessels, tin can bodies, electrical fittings, conduits including those used for electrical wiring, and bellows.

Other objects and advantages of the invention will be apparent from the following specification.

This invention is particularly valuable for and applicable to the production of adherent linings and coatings from high-melting high molecular weight organic polymeric thermoplastic resins such as polyethylene and the linear polyamides generally referred to as nylons. Nylons which are particularly useful are polyhexamethylene adipamide, polyhexamethylene sebacamide, and the polycaprolactams such as the polymer of epsiloncaprolactam. However, the protective coatings of this invention may consist of practically any material which has (1) a transient temperature decomposition point which is reasonably higher than its sintering temperature, and (2) a sintering temperature lower than the melting or deterioration point of the material from which the particular articles to be coated are made.

Among other coating materials which are suitable for the present purposes are most of the thermoplastic resins or those having a thermoplastic phase, and especially those which have a transient decomposition temperature which is sufficiently removed from the melting temperature thereof to permit the material to be applied to the article to be coated by melting. Specific examples of additional materials useful for this purpose are polystyrenes, acrylic resins, bitumen such as gilsonite or asphalt, shellac and wax. Various compatible mixtures of two or more of the above materials may also be employed for the production of coatings in accordance with the present process. In cases where one of the materials in a coating mixture has a melting point which is substantially below the others, the low-melting material acts somewhat as a binder and the high-melting materials as fillers. Various other filler materials may also be added to any of the above coating materials for various purposes such as to impart desired properties or to reduce the cost of the coating materials. Examples of suitable filling materials, for instance, are powdered asbestos, slate, metal powders, heat stable powdered pigment materials, and polytetrafluoroethylene. Abrasive articles may be made by using abrasive fillers. Various other suitable coating materials and mixtures are given in the examples described below and in my United States application Serial Nos. 551,943 and 608,726.

The coating material should preferably be pulverulent in order that it may be readily fluidized as explained below. In addition, it should be capable of being mixed together without appreciable packing or cohesion of the particles into larger aggregates.

In carrying out the coating process of this invention, the coating material, preferably in the form of pulverulent granules, is transformed into a continuously fluidized bed, by introducing at least one current of gas under pressure therein; the bed being maintained in the fluidized state by controlling the flow of the gas. The article to be coated is preheated and is then at least partially immersed in the fluidized bed of coating material, for example by arranging the article to form an extension of the lateral boundaries of the bed so that the expansion in volume attendant upon the fluidization of the material causes it to fill the article. Preferably the article should be contacted for a relatively short time and the expansion and contraction of the bed to fill and empty the article should be rapidly carried out. Individual particles of the coating material adhere and melt and fuse together with other particles on the hot surface of the article forming the confining walls of the expanded bed to form a continuous coating thereon, as described more fully below.

As used in this specification, a fluidized bed is defined as a mass of solid particles which exhibits the liquid-like characteristics of mobility, hydrostatic pressure, and an observable upper free surface or boundary zone across which a marked change in concentration of particles occurs. A fluidized bed differs from a dispersed suspension because a dispersed suspension does not have a definite upper level or interface and the dispersed suspension is usually observed to occur under conditions of extremely low solids concentration and either high fluid velocity or low solids feed rate. Thus, in general, a dispersed suspension is analogous to a vapor, whereas a fluidized bed is analogous to a liquid. In a vessel containing a fluidized bed, a dilute suspension of entrained particles is sometimes formed above the bed which is a dispersed suspension. Such dispersed suspension is frequently referred to as the "disperse phase" while the bed itself is referred to as the "dense phase."

The preheating of the article should be to a temperature above the sintering or melting point of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article.

Figure 2:
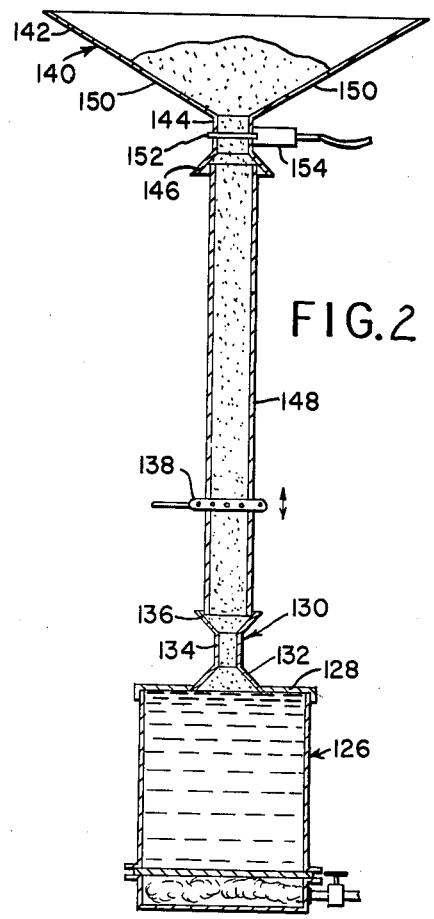
Figure 3:
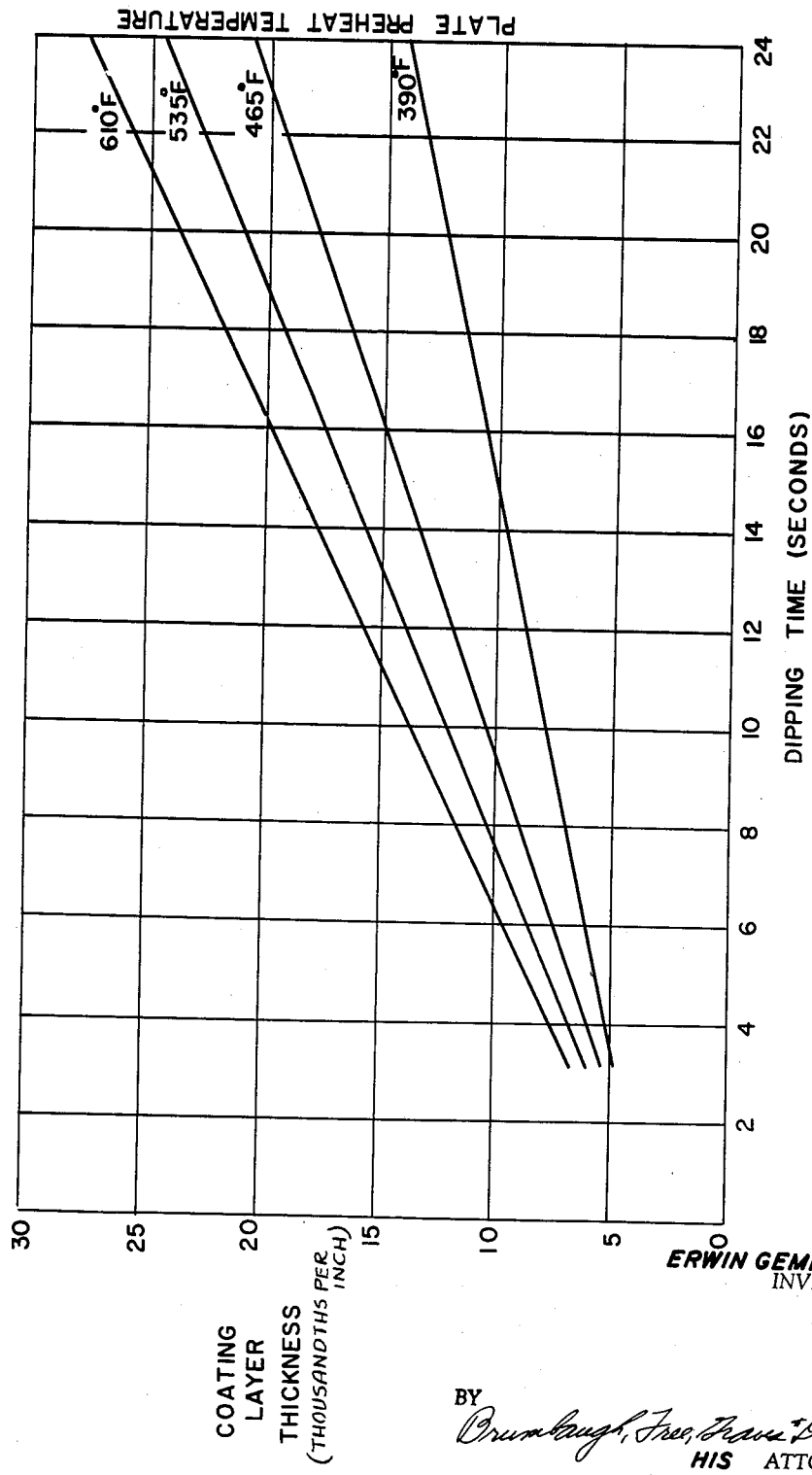

Preferred apparatus for carrying out the process will be hereinafter more fully described in conjunction with detailed reference to the accompanying drawings, wherein:

FIG. 1 is a sectional view of a form of treating tank which is particularly adapted for coating pipe;

FIG. 2 is a sectional view of an alternatively modified form of the treating tank particularly adapted for coating only the interior of a pipe; and FIG. 3 is a chart showing dipping time (powder contact time) versus thickness of coating layer when using polyethylene as the coating layer in the present process at various preheat temperatures; this chart being only representative of the characteristics of many materials which may be used.

In many instances it is preferable to mask portions of the article being coated to avoid having to remove the coating in areas to be welded or so as not to obscure markings, etc. It has been found that application to such areas of various silicone resins which are of grease-like consistency forms an adequate masking thereof.

Any gas which is reasonably inert at the temperatures and with the materials employed may be used as the gaseous medium for fluidizing the coating material. Air is usually satisfactory and is preferred for reasons of economy; however, in order to avoid oxidation, it is sometimes preferable to use nitrogen or some other non-oxidizing gas. The pressure of the gas may vary greatly, depending on the particular shape and dimensions of the treating tank as well as on the particular type of coating material used. The pressure of the gas, however, should not exceed the point where the upper level of the fluidized bed rises beyond the article's upper openings or where an appreciable dust cloud of the coating material is formed above the article. Generally the gas pressure will be in the order of about 7 inches water column depending on the size of the container and depending also on the amount of bed expansion required. The gas supply pressure may be as high as about 15 atmospheres depending upon the diameter of the gas connection and the volume of flow. The consumption of the gas will generally be from about 70 to about 700 cubic feet per hour. It will be understood, of course, that the rate of gas flow is very dependent upon the size and configuration and design of the apparatus which is used for the practice of the process.

The coating material, as has been stated above, is preferably used in pulverulent form and preferably has an average granular size of between about 0.001 and about 0.024 inch. Best results have been obtained with a granular size of between 0.002 and about 0.012 inch. The period of contact with the fluidized bed may vary within relatively wide limits depending upon the thickness of the coating desired. Generally, the time during which the bed is expanded into contact with the surface to be coated is kept below about 50 seconds, and preferably below about 30 seconds. When the bed has been relaxed and contracted out of contact with the surface coated, the latter will initially appear to be covered with a powder. After a short interval of time, however, this powder melts, or coalesces into a continuous coating due to transfer of heat from the heated articles. It will be understood that it is possible to permit the surface to remain in the contacted condition for an indefinite period during which the bed is maintained in its fluidized, expanded state until the surface is cooled and the coating has solidified. If this is done, the coating will be relatively heavy and will possess a rough, powdery outer surface of powdered coating material which has not fully coalesced and is not entirely coherent to the underlying coating. It will be found, however, that the intermediate portions of the coating between the outermost surface and the innermost portions will possess progressively greater degrees of coalescence and that the innermost portions will be completely coalesced into a continuous covering. Such coating structure is desirable for some purposes.

If thin-walled tubes and hollow formed articles are to be coated, the heat energy therein may sometimes not be sufficient to cause the melting of the powder on the surface of the coating although the zone immediately adjacent to the article has melted and uniformly wetted the article. In such instances higher preheating temperatures can be used or the surface of the coating may be subsequently treated with a gas fueled flame as by a manually manipulated torch, or the article as a whole may be set into an oven and heated by any suitable means until the coating is entirely melted. This method may be practiced also to smooth out the coating adhered by the method wherein the article cools in contact with the fluidized material as set out in the previous paragraph. Only a few seconds are generally required to smooth off the surface with an open flame, whereas baking time in the oven should be about 5 to 15 minutes, although the duration of such baking will vary with the materials being used. A relatively short postheating period in a relatively hot oven is found preferable when the coating substance is a polyamide material, while a longer postheating in a less high temperature oven is often preferred with other materials. There are certain other materials which may be injured by any postheating whatsoever.

Either slow or rapid cooling may be carried out; under slow cooling the exclusion of oxygen may be desirable to avoid oxidation damage to the coating. Rapid cooling may be practiced by using a blast of cooling air or by immersion in a tank of water, or by spraying the coating directly with a water spray.

As a preparatory step to applying a coating, if there is grease or oil contamination on the surface, a suitable solvent and rinse such as carbon tetrachloride should be used to remove it. It is sometimes necessary in order to improve adhesion of a coating to the article's surface to clean and roughen it as for example by sand or metal grit blasting or acid etching. A good base for anchoring the coating is particularly desirable for the inside surfaces of small diameter tubes and pipes or wherever a high degree of concavity of the surface exists which may tend to cause stripping stresses due to shrinkage on cooling.

The preferred apparatus for carrying out the process of the present invention generally includes a container of suitable cross-sectional area for holding a quantity of pulverulent coating substance, the container being adapted to have the hollow article to be coated affixed to the upper margins in communicating relation whereby to form an upward extension of the container of reduced cross-sectional area. If the present invention is to be employed to coat an exterior surface of an elongated article or to coat the exterior as well as the interior surface of a hollow article, the upper extension of the container may form a permanent part of the container which is again preferably of reduced cross-sectional area as compared to the container proper. The container proper is itself horizontally divided into an upper powder-filling chamber and a smaller lower gas-admitting chamber by means of a porous partition. This partition, which should be pervious to the gas used but impervious to the particles of coating material, may preferably take the form of a porous ceramic plate, although other similar structures may be advantageously used. A porous plate structure which is preferred is composed of an Alundum refractory material composed of fused alumina grains bonded together with an aluminous glass at a high firing temperature. Whether composed of this or other materials, the porous plate preferably has a gas permeability which may be defined as that which will permit the passage of from one to fifteen cubic feet of air at 70° F. and 25 percent relative humidity through an area of one square foot and a plate thickness of one inch at a pressure differential equivalent to two inches of water in a period of one minute. The average port diameter of the porous plate should preferably be in the range from 0.003 to 0.004 of an inch or less.

The pulverulent coating material is placed within the container on the upper surface of the partition so that a hollow article having an interior surface to be coated will become filled by the swelling bed as it rises under the effect of fluidization. A gas under pressure, as for example air or nitrogen, is blown into the lower chamber of the container and penetrates through the porous partition into the powder mass, causing the powder to be converted into a continuously fluidized bed. This fluidized bed behaves substantially like a liquid so that its particles come into contact with all parts of the surface of an article. When the bed is in such state the individual particles thereof become separated from one another and the bed of coating material appears to expand, becoming less dense to occupy a greater volume than when at rest, the upper surface of the mass of coating material rising to an equilibrium level within the hollow article in accordance with the application of a predetermined pressure and with the predetermined volumetric ratio of the article and the container. As will be indicated more fully below, the volumetric expansion of the bed of coating material upon fluidization is preferably fairly limited. For this reason, it is important to employ a container proper which has a reasonably high initial volume so that a relatively small portionate expansion in the volume of the bed of material will be sufficient to establish contact with the surfaces to be coated.

It will be seen that it is very desirable that the gas should pass through the porous plate through many small, closely-spaced pores in very minute gas streams emanating from such pores. Accordingly, it is important that there be some appreciable degree of resistance to the gas flow through every portion of the porous plate and a measurable pressure drop across the porous plate so as to assure that there is an equilization of pressure on the bottom of the plate and a resulting even and equal flow through all portions thereof.

Before the bed is fluidized and caused to swell within the volume of the article to be coated, the latter is heated to a temperature above the sintering point but below the transient temperature decomposition point of the fluidized material filling the container. When this preheated article has been affixed to the container and the bed is fluidized the fluidized powder then flows into all crevices, channels, holes, grooves and the like so that every part of the surface to be coated comes into contact therewith. It will be understood, of course, that if the coating is only required on a portion of this surface, only that portion will be subjected to the fluidized bed, for example by regulating the air pressure and hence the upper level of the powder. The thickness of the coating can be regulated by the control of the preheating temperature of the article as well as by the variation of contacting time. The relationship of these factors is illustrated for one coating material in FIGURE 3 which is a chart showing the relationship between the dipping (contacting) time and the thickness of the coating layers. The curves on this chart are based on the use of polyethylene as the coating material, and it is presented as an example relating generically to any of the aforementioned coating materials. In the tests performed for the purpose of preparing this chart, the articles coated consisted of steel having a wall thickness of one-eighth of an inch. Where thicker walls are used, the curves begin at approximately the same point but, as the contact time increases, the curves become steeper. For longer dipping times than shown on the chart, all curves asymptotically approach the horizontal. The particle size of the coating material was in the range from 200 to 400 microns. Corresponding charts for other materials show different absolute values but the same or similar characteristic curve shapes.

The range of preheating temperatures practical for the process of this invention has a lower limit set by the melting or sintering point of the material adequate to cause adherence to the base, and an upper limit determined jointly by the melting, softening, or deterioration temperature of the article, and by the transient decomposition temperature of the coating substance. Within this range it will be found that an article of low heat storage capacity per unit of surface area may advantageously be heated up to the coating material steady-state decomposition temperature.

As a specific illustration of the foregoing, a steel pipe having a wall thickness of 0.300 inch which is to be coated with a coating of about 0.008 inch thickness of high pressure polyethylene may be preheated to a temperature of about 390° F. to about 430° F. and immersed for about 10 seconds. In spite of the low heat storage capacity of the article to be coated, such preheating gives an ultimate coating of the specified thickness. Other suitable heating temperatures are discussed in my application Serial No. 551,943.

In general, the upper area of the fluidized bed container will be restricted as by fitting a closely fitted adapter plate whereby to form a closed chamber above the porous plate with a single aperture at the top, the latter being adapted in its cross-sectional area to communicate with the bottom opening of a hollow article to be affixed thereto or with an upper container portion of reduced cross-section. As the material in the container is fluidized it becomes expanded and rises through the aperture and the fluidized powder produces an extension of the bed within the reduced cross-section.

As mentioned above, the process and apparatus of this invention are adapted for use with articles composed of many different materials and for the application of coating of many different materials. The following examples are therefore set forth merely for the purpose of illustrating how the process may be used for various materials, without necessarily limiting the scope of the invention thereto:

*Example I*

A steel pipe, the dimensions of which are 10 feet long by 4 inches I.D. and 0.118 inch wall thickness, can be coated with polyethylene upon its interior surfaces by the present process. The procedure consists of first preheating the pipe in an oven at about 690° F. The preheated article is then affixed in a vertical position upon an aperture in a cover of a filled fluidizing container of polyethylene powder, and this is expanded to fill the pipe for a period of about 14 seconds. The fluidizing bed consists of pure polyethylene having a particle size of between about 0.0078 inch and 0.0157 inch. Fluidizing gas is nitrogen at a temperature of about 68° F. The thickness of the resulting coating is about 0.030 inch. This coating is absolutely free from pores, smooth and glossy. A test with an electric spark device at 25,000 volts indicates no breakdown of the coating.

A workable range of preheat temperatures for the article when employing polyethylene as the coating material is from 375° F. to 700° F.

*Example II*

The same materials and the same general process are used as in Example I. However, the preheating temperature is set at about 535° F. and the contacting time with the fluidized mass of coating powder is about 17 seconds. The thickness of the coating produced is found to be about the same as for Example I.

*Example III*

The same procedure is followed as in Example I, using the same materials; however, the preheating temperature is about 464° F., and the contacting time is about 21 seconds. The thickness of the coating is approximately equal to that of Example I and II, illustrating that the coating thickness may be regulated within a wide range by varying the preheating temperature relative to the period of contacting.

Example IV

A piece of steel alloy pipe, having a length of 6 feet, an interior diameter of 1.97 inches, and a wall thickness of 0.157 inch, is first roughened internally and externally by sandblasting and is then preheated in an electric oven maintained at a temperature of about 534° F. The workpiece is thereafter lowered into and set coaxially of a 5 inch I.D. pipe forming an upward extension of a fluidizing container, which has a filling consisting of a mixture of 90 percent by weight polyethylene and 10 percent by weight of polyisobutylene; the bed is fluidized and swelled to fill the four inch pipe and the workpiece and maintained for about 23 seconds. The particle size of the coating material is from about 0.0078 inch to about 0.0097 inch; the gas used is compressed air at a supply pressure of about 4 atmospheres.

After the bed is collapsed the pipe is removed from the tubular extension and reheated to smooth the coating at a temperature ranging between 255° F. and 302° F. for about 5 minutes. The resultant coating is observed to be smooth and even on both interior and exterior surfaces and is about 0.0354 inch thick.

Example V

A number of steel bushings having an outside diameter of 4.5 inches, an inside diameter of 4.25 inches, and a length of 1½ inches between machined parallel ends are heated to about 670° F. They are then aligned coaxially in a vertical stack with the bottom member set in registery with a circular aperture in the top cover of a fluidizing bed container. The latter is filled with a ground yarn composed of polyhexamethylene adipamide in the form of a fine thread-like powder. The bed is fluidized and caused to swell whereby all of the bushings are filled with the coating material and the bed is maintained in its expanded state for about 3 seconds. It is then rapidly collapsed. The fluidizing gas used is carbon dioxide. After being removed from the stack each of the articles is subjected to a quick pass by a gas flame. The resulting internal coating is observed to have a good appearance and is very smooth, hard, and slightly hazy.

In FIGURE 1 there is illustrated a form of fluidized bed tank which is especially suitable for both the interior and exterior coating of pipes and tubes. This type of device comprises a tank 92, and includes a base portion 94 having a gas inlet 96 controlled by a shut-off valve 98, a removable ceramic filter plate 100 and upstanding walls 102. The top of the tank is closed by a wall 104 having a wide central opening enclosed by a hollow extension 106, extending upwardly from the wall 104 at the top of the tank 92. The top end of the extension 106 flares outwardly as indicated at 108.

Within the tank 92 there is provided a housing 110 having a flared, open bottom 112 spaced from the bottom of the tank and a conical upper opening 114 shaped like a nozzle. At the top of the extension, there is provided a generally conical hollow adaptor 116, supported by a web 117, connected to the member 108. This adaptor has an opening 118 in its nose at the bottom end thereof and is open at the top as at 120.

In operation the preheated pipe 122 which is to be coated is positioned in the extension 106 by removing the adaptor 116 and inserting it downwardly from the top within the container extension 106. The lower end of the pipe is caused to rest upon the conic portion 114 of housing 110, and the upper end of the pipe is supported by the lower portion 118 of the adaptor insert 116, which is securely fastened by conventional clamping devices not shown. The tank 92 has to be of such size that upon the expansion of the powder filling the tank occasioned by the fluidization thereof, it is caused to swell and fill the total space between the extension 106 and the pipe 22 and the inside of the pipe 122 will also become filled completely. Fluidized material rises into the flared portion 108 both from around the pipe and through the hollow insert 116 to completely surround and coat all surfaces of the pipe 122.

In FIGURE 2 there is shown a modified form of apparatus for coating pipes, tubes, or the like. In this form of the invention, the pipe is coated internally only. The apparatus comprises a tank 126, similar in every respect to tank 92 in FIGURE 1, except that its top wall 128 is provided with an upward extension 130 consisting of a low, inwardly tapered wall 132, topped by a cylindrical, hollow portion 134, at the upper end of which is provided a flared portion 136 substantially complementary in shape to portion 132.

A gas-fired ring burner 138, vertically movable relative to the extension 130, may be used for heating the pipe which is to be coated.

A top holder 140 for the pipe is employed which comprises a conical portion 144. At the bottom thereof, the cylindrical portion 144 is provided with an outwardly flared flange 146. The top holder 140 is vertically movable into and away from the operative position, shown in FIGURE 2, wherein it clampingly holds the pipe 148 which is to be coated. This movement may be effected either by hingedly mounting the top holder to a support, not shown, or by making it vertically movable on a support, not shown. Windows 150 are provided in the top holder portion 142 for the purpose of viewing the amount of powder accumulated.

A ring 152 encircles the cylindrical portion 144 of the top holder, this ring being supported on a bracket 154. The bracket 154 is connected to a motor-driven vibratory device, not shown.

In operation, the top holder 140 is withdrawn to permit the pipe 148 to be inserted upon the portion 136. The ring 138 is then slipped over the pipe and the top holder is brought down to seat member 146 over the top of pipe 148. The pipe is then preheated by use of the ring 138 and sliding it up and down along the pipe until it has been heated sufficiently. The bed is then fluidized by the incoming pressure of the gas and the fluidized particles travel upward through the pipe into the portion 142 of the top holder. Meanwhile, the pipe is given a vibratory motion by the operation of the ring 152. If desired, a minimum temperature may be maintained by continued use of the ring burner 138 during application of the coating.

If preferred, other conventional heating devices may be employed instead of the gas ring burner 138. Such devices may include, for instance, electrical resistive heating elements, radiant heaters, or induction or high-frequency electrical heaters, etc. It may also be desirable to simply omit the use of such heating devices and to preheat the pipe 148 which is to be coated in a suitable conventional oven prior to assembly of the pipe to this coating apparatus including the tank 126 and the holder 140.

After the internal coating has been effected, the fluidizing gas is shut off and the powdered particles are permitted to fall back through the pipe into the tank.

It may be generally stated that the expansion or swelling in the volume of the pulverulent coating material upon fluidization will range from approximately 20 percent to 120 percent of the initial volume, although expansion percentages which are outside of this range are known to be obtainable with some materials. Usually, however, the expansion percentage is near the lower end of the above-mentioned range and preferably does not exceed an expansion of 50 percent. It is therefore preferred that the total volume of the container extension 106 in FIGURE 1 or the interior of the pipe 148 in FIGURE 2 should not be in excess of from 20 to 50 percent of the volume of the container proper which is normally completely filled by the unfluidized bed of coating material.

This means, of course, that when larger articles are to be coated, the container proper must also be of sufficiently greater volume.

The following claims are intended to define the valid scope of this invention over the prior art and to cover all changes and modifications falling within the true spirit and valid scope of the invention.

I claim:

1. The process of forming a coherent layer of material on the interior surface of a hollow article having oppositely disposed openings which comprises heating said article to a predetermined temperature below the deterioration temperature of the article, forming a fluidized bed in a chamber by passing a current of gas through a mass of solid pulverulent layer-forming material having particles therein with a sintering temperature below said predetermined temperature, increasing the velocity of said fluidizing gases adjacent the upper portion of said chamber and expanding said mass through an opening of said article whereby said mass fills said article and is confined laterally by the interior surface of said hollow article to deposit a coating of said particles on said interior surface, and then cooling the coated article.

2. The process of claim 1 wherein the layer-forming material is fluidized to an apparent density of no less than one-third that of the unfluidized mass of the material at rest by a low velocity column of ascending gas.

3. The process of claim 1 wherein the material is also directed against the outer surface of the article.

4. The process of coating an elongated hollow article having at least two oppositely disposed openings therein which comprises heating said article to a predetermined temperature below the melting temperature of the article, positioning said article to register one of said openings with an aperture in a cover for a fluidization chamber, fluidizing a mass of solid pulverulent coating material filling said chamber and increasing the velocity of the fluidizing gases adjacent the upper portion of said chamber to cause it to expand and flow upwardly through the registered opening of said article and to be confined laterally thereby for a predetermined time, said material having a melting point which is lower than said predetermined temperature, collapsing said fluidized mass to occupy its rest volume and to recede from within the hollow article, and cooling the article, thereby to produce a continuous coating thereon.

5. The process of coating the surfaces of an article whose length is a large multiple of its largest transverse dimension, comprising heating said article to a predetermined temperature above the melting point of an ingredient of the coating, inserting the article within a vertical tubular body of corresponding length whose cross-section is greater than that of the article, fluidizing a mass of solid pulverulent coating material in a chamber positioned beneath said tubular body and in registry therewith, filling the space between said body and said article by an upwardly entering mass of the fluidized solid pulverulent coating material to contact the surfaces, the cross sectional area between the tubular body and said article being substantially less than the area in the fluidizing chamber whereby a substantial increase in velocity of the fluidizing gases adjacent the upper portion of said chamber is obtained, and emptying the space by downward retreat of said mass.

6. The process of claim 5 wherein the mass comprises an expanded portion of a body of said coating material occupying a storage volume at least twice as large as the volume of said space.

7. A process for forming a coherent layer of material on the interior surface of a hollow article having at least two oppositely disposed openings therein, which comprises; heating said article to a predetermined temperature below the melting point of the article; positioning one of said openings of said article in registry and sealing relationship with the uppermost portion of a fluidizing chamber, fluidizing a mass of solid pulverulent coating material within said chamber by the upward passage of gases through said chamber, said material having a melting point that is lower than said predetermined temperature; increasing the velocity of said fluidizing gases adjacent the upper portion of said chamber thereby causing said fluidized mass of solid pulverulent material to expand and flow upwardly into the interior of said hollow article; collapsing said fluidized mass by interrupting the upward flow of gas through said fluidizing chamber; and cooling said article.

8. A process for forming a coherent layer of material on the interior surface of a hollow article having oppositely disposed openings which comprises heating said article to a predetermined temperature below the deterioration temperature of the article, forming a fluidized bed in a chamber by passing a current of gas through a mass of solid pulverulent layer forming material having particles therein with a sintering temperature below said predetermined temperature, increasing the velocity of said fluidizing gases adjacent the upper portion of said chamber and expanding said mass through an opening of said article whereby said mass fills said article and is confined laterally in a fluidized state by the interior surface of said hollow article to deposit a coating of said particles on said interior surface, and then cooling the coated article.

9. Apparatus for coating an article comprising a closed tank, a gas-pervious partition dividing said tank into upper and lower chambers and adapted to support a fluidizable material thereon, a fluid inlet in said lower chamber, means adapted to connect said inlet to a source of gas under pressure, a housing having a reduced upper portion positioned in spaced relation above said partition, a funnel-shaped container positioned in vertical spaced relation above said housing, and a hollow adaptor depending from the narrow end of said funnel-shaped container, said housing and adaptor being constructed and arranged to releasably clamp a tubular article to be coated between said tank and said container.

10. The apparatus of claim 9 wherein a second housing extends between said tank and said container in surrounding relationship to said first mentioned housing and said adaptor.

11. The apparatus of claim 9 wherein a heating ring is slidably positioned surrounding a tubular article to be coated between said housing and said adaptor for vertical movement therebetween.

12. The apparatus of claim 9 wherein a vibrator is connected to said adaptor.

13. Apparatus for use in applying a coating to the surfaces of an elongate article, comprising a tank having a bottom and side walls, a gas-pervious partition for supporting a fluidizable coating of solid pulverulent material separating the tank to provide an upper and a lower chamber and having a fluid inlet into said lower chamber, said upper chamber having a cover and a fluid outlet therein, an elongate tubular extension having its lower end registered with said fluid outlet disposed vertically above and connected with said cover, and means disposed adjacent the upper and lower portions of said tubular extension along the axis thereof to retain an elongate article within said extension.

14. Apparatus as in claim 13 wherein said extension has a volume not greater than one-half of the volume of the upper chamber.

15. Apparatus as in claim 13 wherein said fluid outlet has an area which is a small fraction of the area of the gas-pervious partition.

16. Apparatus as in claim 13 wherein a hollow conical body having its axis vertical and coaxial with said fluid outlet is secured within said upper chamber and the apex of the cone is directed upwardly beyond the cover, said conical body being arranged to support the lower end of a hollow elongate article to be coated whereby the pulverulent material passing into said cone enters the interior of said article.

17. Apparatus for use in applying a coating to all surfaces of an elongate hollow article having oppositely disposed openings, comprising a tank having a bottom and side walls, a gas-pervious partition for supporting a fluidizable coating of solid pulverulent material separating the tank to provide an upper and a lower chamber and having a fluid inlet into said lower chamber, said upper chamber having a cover and a fluid outlet therein, an elongate tubular extension having its lower end registered with said fluid outlet disposed vertically above and connected with said cover, and means disposed adjacent the upper and lower portions of said tubular extension along the axis thereof to retain an elongate article therein, the means supporting the lower end of said article comprising a frustrum of diminishing cross sectional area positioned with its apex proximate end uppermost, and sealing means arranged therewith and adapted to receive an opening in said hollow article.

18. Apparatus for contacting the interior of a hollow article with pulverulent material comprising a tank, a gas-pervious partition adapted to support said pulverulent material adjacent the base of said tank in sealing relationship with the lateral walls of said tank, and means for establishing and maintaining an upward flow of gas through said partition in a manner adapted to fluidize said material; said tank comprising a lower portion of substantially uniform cross-sectional area and an upper portion comprising a frustum of diminishing cross-sectional area positioned with its apex proximate end uppermost, said upper and said lower portions being positioned in registry and sealing relationship with each other, and sealing means at the uppermost portion of said upper section adapted to receive an opening in said hollow article.

References Cited in the file of this patent

UNITED STATES PATENTS

| 1,687,102 | Meurer | Oct. 9, 1928 |
| 2,414,625 | Abrams et al. | Jan. 21, 1947 |
| 2,478,940 | Pape | Aug. 16, 1949 |
| 2,539,263 | Munday | Jan. 23, 1951 |
| 2,586,818 | Harms | Feb. 26, 1952 |
| 2,666,269 | Parry | Jan. 19, 1954 |
| 2,719,093 | Voris | Sept. 27, 1955 |
| 2,729,194 | Jones | Jan. 3, 1956 |
| 2,815,550 | Valyi | Dec. 10, 1957 |
| 2,844,489 | Gemmer | July 22, 1958 |
| 2,880,109 | Current et al. | Mar. 31, 1959 |

FOREIGN PATENTS

| 579,442 | Great Britain | Aug. 2, 1946 |

OTHER REFERENCES

Gemmer, Industrie-Anzeiger, 75th Year, No. 12, February 10, 1953, pp. 141–143.

UNITED STATES PATENT OFFICE
CERTIFICATE OF CORRECTION

Patent No. 3,063,860                      November 13, 1962

Erwin Gemmer

It is hereby certified that error appears in the above numbered patent requiring correction and that the said Letters Patent should read as corrected below.

Column 4, line 21, for "5 to 15" read -- 5 to 10 --.

Signed and sealed this 23rd day of April 1963.

(SEAL)
Attest:

ERNEST W. SWIDER
Attesting Officer

DAVID L. LADD
Commissioner of Patents